Dec. 11, 1951 R. S. CRANMER 2,577,876

PHONOGRAPH CONTROL ARRANGEMENT

Filed Feb. 3, 1949

INVENTOR.
RICHARD S. CRANMER
BY
Brown, Denk & Synnestvedt
AGENTS

Patented Dec. 11, 1951 2,577,876

UNITED STATES PATENT OFFICE 2,577,876

PHONOGRAPH CONTROL ARRANGEMENT

Richard S. Cranmer, Wyncote, Pa., assignor to Philco Corporation, Philadelphia, Pa., a corporation of Pennsylvania Application February 3, 1949, Serial No. 74,325

3 Claims. (Cl. 179—100.4)

Figure 1:
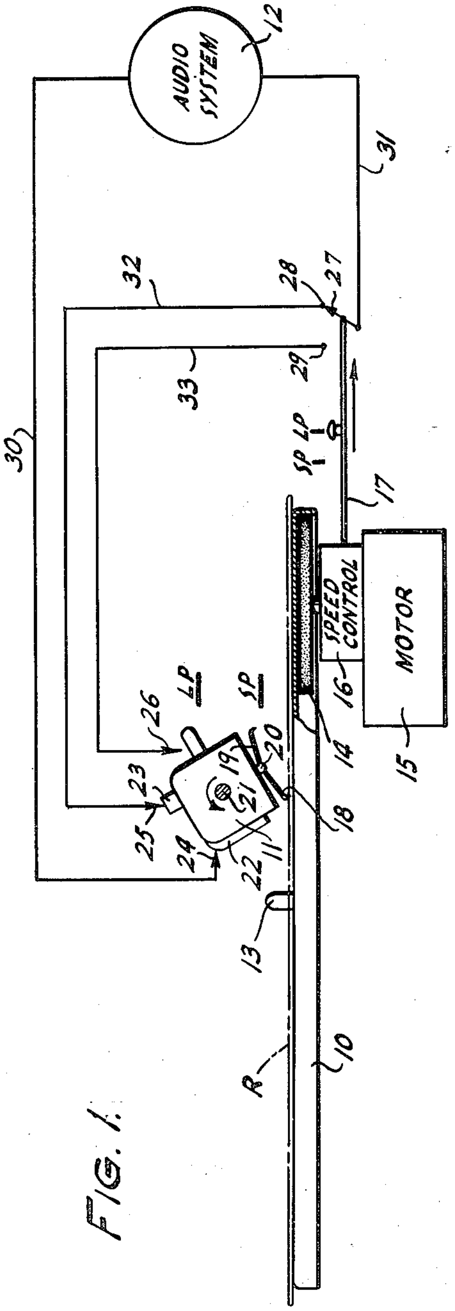

The present invention relates to phonograph instruments and, particularly, to an arrangement for controlling the operation of phonographs adapted to play records of distinctly different types.

For many years, most of the so-called lateral-cut records, especially those manufactured for home use, have been designed to play at a turntable speed of 78 R. P. M. The groove of these records has a width of the order of 0.006 inch at the surface of the record, and a bottom radius of approximately 0.0023 inch. Recent developments have brought forth improved lateral-cut records for home use, which records are designed to play at a considerably reduced turntable speed. The groove of these improved records has a width of the order of 0.003 inch at the surface of the record, and a bottom radius of about 0.0002 inch.

One of the recognized requirements for adequate playing of a lateral-cut record without undue wear of the reproducing stylus or needle, is that the stylus or tip of the needle be so dimensioned as to fit properly in the groove to contact substantial portions of the opposite sides of said groove without touching its bottom surface. Because of this requirement, it will be appreciated that, in order to play the two above mentioned types of record on the same phonograph instrument, the instrument must be provided not only with means capable of imparting the proper rotational speed to the turntable, but also with two styli or needles, one being adapted for cooperation with records of one type, and the other being adapted for cooperation with records of the other type. In practice, it has been found desirable to associate the two styli or needles with a single pickup unit mounted in a single tone-arm structure, so as to eliminate costly duplication of parts, as well as to do away with overcrowding of elements about the turntable. Accordingly, it has been proposed to mount a dual-stylus or two needle pickup unit within a tone-arm head in such a manner that said unit may be adjustably moved to one or the other of two positions so that, depending upon the type of record to be played, one or the other of the two styli or needles is brought in place for engagement with the record.

The use of a single tone-arm with a single pickup unit supplied with two styli or needles of different characteristics, results in problems which arise chiefly from the fact that the user must select not only the proper turntable speed, but also the proper stylus or needle for the type of record to be played. It will be apparent that an improper selection is likely to result in injury to the stylus or tip of the needle, since the stylus or the tip of an improperly selected needle will not correctly fit the recorded groove. The injury is bound to be disastrous when the improper stylus or needle tip is permitted to remain in engagement, for an extended period of time, with the modulated groove of the rotating record. Heretofore, the assurance of selection of the proper stylus or needle for the type of record to be played, has been entirely dependent upon the care and attention of the user in adjusting the pickup unit in that position which brings the required stylus or needle in place for engagement with the record. Thus, unless the user pays close attention to the selection, he is given no indication that the stylus or needle being used is the correct or the incorrect one for the record being played.

It is, therefore, the primary object of this invention to obviate the above stated difficulties and objections by providing an arrangement which makes it possible to detect a condition in which the improper stylus or needle is being used. With an arrangement of this kind, the existence of a condition as above noted can be soon detected by the user who, then, may readily correct such condition before serious damage can be done.

Another and more specific object of the invention has to do with control of the operation of a phonograph audio system so that, unless both the proper stylus or needle and the proper speed are selected for the type of record which the user desires to play, said system is rendered inoperative and will emit no sound, thereby indicating to the listening user that a maladjustment exists either in the selection of the stylus or needle, or in the selection of the speed. To that end, the invention employs a switching arrangement, parts of which are provided by the pickup unit and the speed control adjustor. This arrangement is such that correct adjustment of the pickup unit and correct adjustment of the speed control mechanism are necessary for energization of the audio system. Also, the listening user is able to detect a condition in which the stylus or needle and the speed are related to play one type of record, but in which a record of the other type is on the turntable, since the playing of a record at the improper speed results in a highly noticeable distortion which audibly indicates the existence of the faulty condition.

Figure 2:
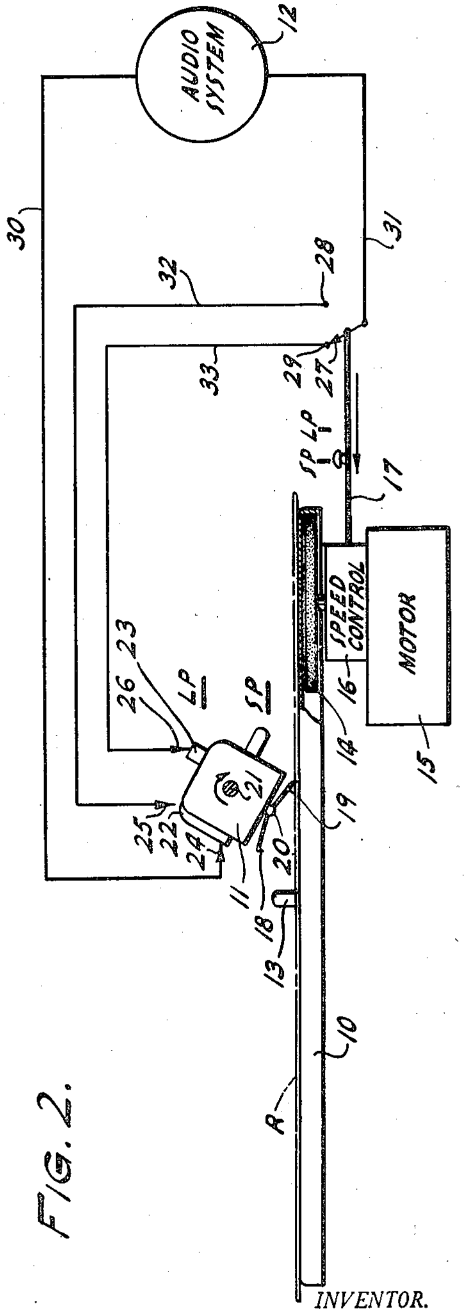

These and other objects and the manner in which they are attained, will clearly appear from the following description based on the accompanying drawing, in which:

Figure 1 is a diagrammatic view illustrating an arrangement constructed in accordance with the invention and adjusted in one of its operating positions; and Figure 2 is a view similar to Figure 1 showing the arrangement adjusted in the other of its operative positions.

With more particular reference to the drawing, the phonograph instrument, as shown, basically includes a turntable 10, a pickup unit 11 and an audio system 12. The turntable is provided with a central spindle 13, and is adapted to support records, one of which is represented at R. The turntable is mounted on the usual supporting base (not shown) so as to be rotated by means of a suitable type of driving mechanism, for instance, that type of mechanism which includes a driving wheel 14 and a motor 15 for driving said wheel. The pickup unit is disposed for cooperation with the modulated groove of the record to be actuated by said groove. As is well known, actuation of the pickup unit generates electrical signals which are transmitted to the audio system which converts said signals into sound. In practice, the pickup unit is supported by a suitable tone-arm structure (not shown) which, as is customary, is mounted to pivot with respect to the turntable.

As hereinbefore indicated, the phonograph instrument is adapted to play records of fundamentally different types, for instance, records having a relatively narrow groove designed to be played at a predetermined relatively slow rotational speed, and records having a wider groove designed to be played at a predetermined faster rotational speed. These two types of records have become known in the trade as "long play" records and "standard play" records, respectively.

In order to provide for adjustment of the turntable rotation to one or the other of the two different speeds, a speed control 16 of any suitable known construction, is associated with the driving mechanism of the turntable. This control includes a manipulator or adjustor 17 which, when manually moved to one position, sets the driving mechanism to rotate the turntable at the predetermined rate of speed for the "long play" record, and when manually moved to the other position, sets the driving mechanism to rotate the turntable at the predetermined rate of speed for the "standard play" records.

In the arrangement as shown in the drawing, the pickup unit is supplied with two needles 18 and 19, one needle having a tip dimensioned to fit the groove of the "long play" record, and the other needle having a tip dimensioned to fit the groove of the "standard play" record. The two needles are incorporated in a unitary structure and, for that purpose, are attached to a shank 20 which is conveniently connected with the electromechanical device of the pickup unit. The needles extend in diametrically opposite directions from the shank 20, and the pickup unit is mounted to pivot about an axis, represented at 21, to permit the tilting of said unit either to the left or to the right, as viewed in the drawing, so as to place one needle in the record playing field and the other needle out of said field.

In accordance with this invention, the arrangement is such that the user is given positive information (other than by visual indicia means such as LP and SP) to the effect that the improper needle is being used for the type of record being played. In other words, the arrangement does not depend solely upon the attentiveness of the user in selecting the proper needle and speed, but is adapted to warn the user that the phonograph instrument is improperly set. For that purpose, the pickup unit and the speed control manipulator cooperate with switching means to close the circuit of the audio system when the adjustments of said unit and manipulator are properly related, and to open said circuit when said adjustments are improperly related.

As illustrated in the drawing, the pickup unit is provided with two contact elements 22 and 23, which elements are arranged to move with said unit. The contact element 22 is disposed for constant engagement with a fixed contact point 24, regardless of the position of the pickup unit. The contact element 23 is disposed for selective engagement with either a fixed contact point 25 or a fixed contact point 26, depending upon the position of said unit. As also illustrated in the drawing, the speed control manipulator 17 is conveniently connected with a movable contact member 27. This member is adapted for selective engagement with either a fixed contact point 28 or a fixed contact point 29, depending upon the position to which the manipulator is moved. Conductors 30 and 31 connect the audio system with contact point 24 and contact member 27, respectively; a conductor 32 connects contact point 25 with contact point 28; and a conductor 33 connects contact point 26 with contact point 29.

The operation of the above described arrangement will be clearly understood from a comparison of the two figures of the drawing. Assuming that the phonograph instrument is adapted for "long play" records when the pickup unit and the speed control manipulator are adjusted as shown in Figure 1, and that the instrument is adapted for "standard play" records when said unit and manipulator are adjusted as shown in Figure 2, then it will be apparent that, in either case, the circuit between the pickup unit and the audio system is complete. Thus, voltage which is developed in the pickup unit as a result of the movement of the needle in response to the modulated groove of the record, is applied to the audio system to reproduce the recorded sound. It will also be apparent that the circuit between the pickup unit and the audio system will be incomplete and, therefore, the audio system will emit no sound, should the pickup unit be moved to its alternate position from the position shown in the figures without changing the position of the speed control manipulator, or should the manipulator be moved to its alternate position from the position shown in the figures without changing the position of the pickup unit. In either of the two latter conditions, the user, failing to hear any sound, is promptly warned of the maladjustment so that the necessary readjustment may be made. This feature is particularly important when it is the pickup unit which is maladjusted because, in that case, the improper needle is in use and damage to the needle tip is apt to result if the condition were permitted to continue for an extended period of time.

In the event that the pickup unit and the speed control are in proper relationship to play one type of record, and a record of another type is played on the turntable, the user will also be given warning of this undesirable condition. This warning will come from the pronounced distorted reproduction which results from the playing of a record at improper speed. Thus, the listening user will readily detect the faulty condition and may correct the same before serious damage occurs.

From the foregoing description, it will be appreciated that the present invention provides a simple, effective arrangement which can be conveniently incorporated in a phonograph instrument to insure against using the improper stylus or needle in playing records of different types. Because the arrangement is such that the user can detect the existence of a faulty condition almost as soon as the stylus or tip of the needle engages the modulated groove of the record, it is possible for the user to remedy the condition promptly, thereby preventing undue injury to the stylus or needle tip, and possibly to the record groove itself.

I claim:

1. In a phonograph instrument of the kind adapted to operate at selectable predetermined rates of speed and with selectable differently dimensioned styli, means for selecting the operational speed of the instrument, means for selecting the stylus to be used in conjunction with the selected speed, an audio system, and a pair of independently operable switches in circuit with said system for controlling the operation thereof in accordance with the stylus and speed selection, one switch having contact means connected with the stylus selecting means and operable in response to stylus selection, the other switch having contact means connected with the speed selecting means and operable in response to speed selection.

2. In a phonograph instrument for use with records having a relatively narrow groove designed to be played at one predetermined rate of speed, and with records having a wider groove designed to be played at another predetermined rate of speed; a turntable driving mechanism including a speed adjustor adjustable selectively to obtain either of said speeds, a pickup unit provided with two styli, one adapted for cooperation with said narrow groove and the other adapted for cooperation with said wider groove, said unit being adjustable so as to bring either of said styli to operative position with respect to a record, an audio system electrically connected with said unit, and a pair of independently operable switches in the electrical connection between said unit and audio system to render said system operative when the stylus and speed adjustments are properly related and to render said system inoperative when the stylus and speed adjustments are improperly related, one of said switches having contact means connected with said pickup unit and operable in response to stylus selection by adjustment of said unit, the other of said switches having contact means connected with said speed adjustor and operable in response to speed selection by adjustment of said adjustor.

3. In a phonograph instrument, a turntable driving mechanism including a speed adjustor mounted for manual adjustment to set said mechanism for operation at different and selectable predetermined rates of speed, a pickup unit having differently dimensioned styli and mounted for manual adjustment to bring a selected stylus into operative position, an audio system, and circuit means including a pair of independently operable switches to establish electrical connection between the pickup unit and the audio system, one of said switches having contact means connected with the pickup and operable in response to stylus selection through manual adjustment of said unit, the other of said switches having contact means connected with said speed adjustor and operable in response to speed selection through manual adjustment of said adjustor.

RICHARD S. CRANMER.

REFERENCES CITED

The following references are of record in the file of this patent:

UNITED STATES PATENTS

| Number | Name | Date |
|---|---|---|
| 1,662,168 | Reynolds | Mar. 13, 1928 |
| 1,822,932 | Loughridge | Sept. 15, 1931 |
| 2,102,316 | Guedon | Dec. 14, 1937 |
| 2,113,401 | Goldsmith | Apr. 15, 1938 |